July 18, 1967     J. A. BRIDGES     3,331,522
METAL VACUUM BOTTLE WITH PLASTIC JACKET
Filed Dec. 27, 1965
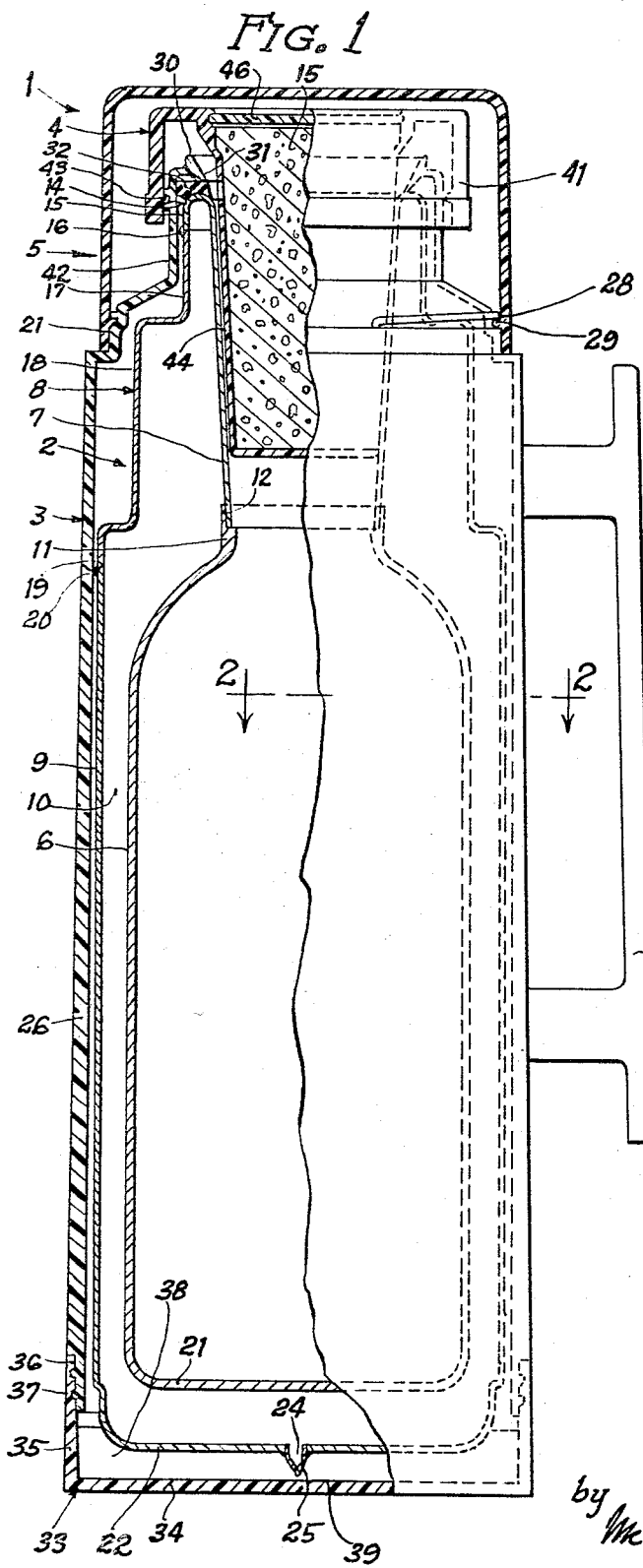
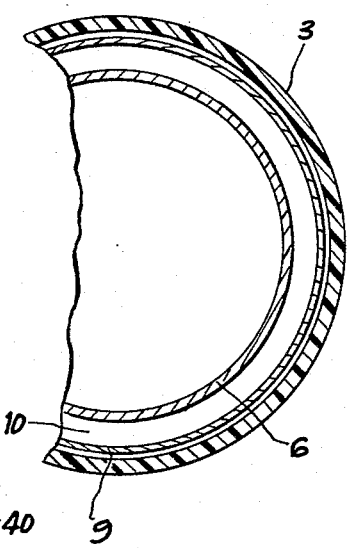
INVENTOR
John A. Bridges
by McDougall, Hersh & Scott
Attys United States Patent Office 3,331,522
Patented July 18, 1967

3,331,522
METAL VACUUM BOTTLE WITH PLASTIC JACKET
John A. Bridges, Nashville, Tenn., assignor to Aladdin Industries, Incorporated, Chicago, Ill., a corporation of Illinois
Filed Dec. 27, 1955, Ser. No. 516,484
10 Claims. (Cl. 215—13)

ABSTRACT OF THE DISCLOSURE

A vacuum bottle having a metal double-walled vacuum insulated receptacle surrounded by a plastic jacket;

Said receptacle having an aluminum inner shell, a mild steel outer shell, and a stainless steel neck member connected between said shells;

Said neck member having an upper end portion in the form of a flange curving outwardly and downwardly to form a skirt portion connected to said outer shell;

Said jacket being formed with a pouring lip, a sealing ring being provided between said pouring lip and said neck member.

---

This invention relates to vacuum bottles and pertains particularly to such bottles of the type comprising a vacuum insulated receptacle made of metal.

One object of the present invention is to provide a new and improved metal vacuum bottle of composite construction, comprising an inner shell made of aluminum, or some other soft corrosion-resistant metal which is easily worked, together with a neck portion made of stainless steel, or some other metal which has a low heat conductivity and is highly resistant to corrosion.

A further object is to provide a composite metal vacuum bottle of the foregoing character having an outer shell made of a metal which is inexpensive, yet strong and easily worked, such as ordinary mild steel.

Another object of the present invention is to provide a new and improved vacuum bottle comprising an all-metal vacuum insulated receptacle, together with an outer jacket made of plastic or other similar material.

A further object is to provide a new and improved vacuum bottle of the foregoing character in which the plastic jacket is molded with a pouring lip, a handle, and threads to receive a screw-on stopper and a cup.

It is a further object to provide such a new and improved vacuum bottle in which the plastic jacket protects the outer shell of the metal vacuum insulated receptacle from corrosion and damage, so that the outer shell may be made of an inexpensive material such as mild steel or the like.

Further objects and advantages of the present invention will appear from the following description, taken with the accompanying drawings, in which:

FIG. 1 is an elevational view, partly in section, of a vacuum bottle to be described as an illustrative embodiment of the present invention.

FIG. 2 is a fragmentary cross section, taken generally along the line 2—2 in FIG. 1.

As already indicated, FIGS. 1 and 2 illustrate a vacuum bottle 1 which comprises a vacuum insulated receptacle 2 made entirely or substantially entirely of metal. The illustrated vacuum bottle 1 is fitted with an outer jacket 3 made of a resinous plastic material or the like.

A stopper 4 is provided to close the vacuum insulated receptacle 2. The illustrated stopper 4 is of the screw-on type. The vacuum bottle 1 may also be provided with a cup 5 which screws onto the upper end of the jacket 3 and serves as a cover for the stopper 4.

As illustrated, the metal vacuum insulated receptacle 2 is of composite construction, comprising an inner shell 6, a neck 7, a collar 8, and an outer shell 9. Vacuum insulation is provided by an evacuated space 10 between the inner and outer shells 6 and 9.

The inner shell 6 is generally bottle-shaped and is formed with a necked-down upper end portion 11. Preferably, the inner shell 6 is made of a soft, inexpensive metal, such as aluminum, which may be easily worked. Aluminum also has other advantages, in that it has very low emissivity and is corrosion resistant and highly reflective. The aluminum inner shell 6 does not affect the taste of any beverage or food which may be kept in the vacuum bottle. The low emissivity of the aluminum inner shell 6 contributes to the insulation value of the vacuum bottle by making the inner shell a poor radiator of heat.

The aluminum inner shell 6 may be formed by an impact extrusion process, followed by a necking down operation to from the reduced upper end portion 11. When produced by this process, the aluminum inner shell 6 is seamless and smoothly contoured, so that it is easy to keep cleaned and sanitary.

The lower end of the neck 7 is welded, brazed or otherwise secured to the upper end of the inner shell 6. In the illustrated construction, the upper end portion 11 of the inner shell 6 is formed with an internally enlarged annular seat or recess 12 for receiving the lower end of the neck 7.

It will be seen that the neck 7 is generally tubular or cylindrical in form, but it tapers downwardly in diameter. The neck 7 is made unusually long and thin-walled, to minimize the transfer of heat along the neck by conduction between the inner and outer shells 6 and 9. The neck 7 is preferably made of stainless steel, or some other similar metal which has a low heat conductivity, so as to minimize the conduction of heat along the neck. Stainless steel also has the advantage of being highly resistant to corrosion. The stainless steel neck 7 will not affect the taste of any beverage or food which is kept in the vacuum bottle.

The stainless steel neck 7 may be brazed to the aluminum inner shell 6 by known brazing methods. Alternatively, the neck 7 may be welded to the inner shell 6. For example, a friction welding operation may be employed, in which heat is generated at the joint between the inner shell 6 and the neck 7 by producing relative rotation therebetween. The speed of rotation is made sufficiently high to elevate the temperature of the joint to a welding temperature. When a sufficiently high temperature is reached, the rotation is stopped, whereupon a weld forms between the inner shell 6 and the neck 7.

Other processes may be employed to form a sealed joint between the neck 7 and the inner shell 6. Thus, various adhesive bonding processes may be employed. For example, a small amount of an epoxy adhesive may be employed to form a strong, vacuum tight joint between the neck 7 and the inner shell 6. This may be used in conjunction with a shrink type fit in which the aluminum is heated and fitted over the stainless neck, and then is allowed to cool to room temperature.

The upper end of the neck 7 is formed with an annular flange 14 which curves outwardly and then downwardly to form a skirt-like portion 15. The lower end of the skirt-like portion 15 is connected to the upper end of the collar 8. A welded joint 16 is preferably formed at this point, but the joint may be formed by brazing or other joining operations. The collar 8 is preferably made of an inexpensive material which is easily worked, such as ordinary mild steel. Inasmuch as the collar 8 is concealed within the plastic jacket 3, there is no need to make the collar of an expensive material such as stainless steel. The outside of the collar 8 may be protected from corrosion by applying a coating of primer paint or other suitable material.

The illustrated collar 8 has a reduced upper end portion 17 of the same diameter as the skirt 15, an intermediate portion 18 of greater diameter, and a lower portion 19 of a still greater diameter, corresponding to the diameter of the outer shell 9. A welded joint 20 is preferably formed between the collar 8 and the outer shell 9, but the joint may be formed by brazing, soldering or other suitable operations. It will be seen that the outer shell 9 is generally cup-shaped and is tall enough to surround the major portion of the inner shell 6. The inner and outer shells 6 and 9 have bottom walls 21 and 22 which are spaced well apart. The outer shell 9 is preferably made of a metal which is inexpensive and easy to work, such as ordinary mild steel. Here again, the outer shell 9 is concealed from view by the plastic jacket 3, so that it is not necessary to make the outer shell of an expensive material such as stainless steel. The outer shell 9 may be painted or otherwise coated to protect it from corrosion.

The bottom wall 22 of the outer shell 9 is formed having an opening 24 therein through which the space 10 between the inner and outer shells 6 and 9 is evacuated during the manufacture of the vacuum bottle. After the space 10 has been evacuated, the opening 24 is closed. This may be done with solder or other suitable material. However, it is preferred to provide a copper tube 25 which is brazed or otherwise secured to the bottom wall 22, around the opening 24, and is subsequently pinched off, using great pressure and hardened steel jaws.

The protective jacket 3 is preferably made of an inexpensive plastic material which is easy to mold, such as polystyrene, polyethylene or polypropylene, for example. The plastic material should be of high impact strength so as to be virtually unbreakable.

As illustrated, the plastic jacket 3 has a generally cylindrical wall 26 which, however, tapers upwardly at a small angle to facilitate the molding operation. Near its upper end, the outer jacket 3 is formed with a reduced portion 27 for receiving the cup 5. Screw threads 28 are molded on the reduced portion 27 to mate with similar screw threads 29 on the inside of the cup 5.

The extreme upper end of the jacket 3 is molded to form an annular pouring lip 30 which flares upwardly and outwardly. In this way, a beverage or other liquid may be poured from the vacuum bottle without dripping or running down the outside of the jacket. The lower end of the pouring lip 30 is in the form of an annular flange 31 which projects downwardly and inwardly. A sealing ring 32 is compressed between the flange 31 and the rounded upper side of the flange 14 on the neck 7. The sealing ring 32 prevents any leakage of liquids into the space between the vacuum insulated receptacle 2 and the outer jacket 3. The sealing ring may be made of a soft resilient material, such as rubber, synthetic rubber or various plastics.

In the illustrated vacuum bottle 1, the lower end of the jacket 3 is fitted with a removable closure or cover 33, having a circular bottom wall 34 and a generally cylindrical side wall 35. The jacket 3 has a reduced lower end portion 36 for receiving the bottom closure 33. Mating screw threads 37 are formed between the side wall 35 and the reduced portion 36. The outside of the side wall 35 is substantially flush with the outside of the side wall 26 on the jacket 3.

A plurality of radial ribs 38 are preferably formed on the inside of the bottom closure 33 to engage and support the vacuum insulated receptacle 2. The upper edges of the ribs 38 are contoured to fit the room wall 22 of the outer shell 9. It will be seen that a central opening or recess 39 is formed in the ribs 38 to clear the seal-off zone on the bottom wall 22.

When the bottom closure 33 is screwed tightly onto the jacket 3, the vacuum insulated receptacle 2 is pressed firmly against the sealing ring 32, which in turn is pressed against the sealing flange 31 of the pouring lip 30, so that a tight seal is formed between the pouring lip and the upper end of the vacuum insulated receptacle 2. The vacuum bottle may readily be disassembled by unscrewing and removing the bottom closure 33.

The illustrated jacket 3 is formed with a convenient handle 40 which is molded integrally with the side wall 26. In this way, the handle 40 may be formed at low cost.

The illustrated stopper 4 is of the screw-on type, having an outer flange or skirt 41 which fits over a reduced portion 42 on the upper end of the jacket 3. Mating screw threads 43 are formed between the inside of the flange 41 and the outside of the reduced portion 42.

The illustrated stopper 4 has a downwardly tapering plug or closure portion 44 which fits tightly into the tapered neck 7. The plug portion 44 may be hollow and cup-shaped in form and may be molded integrally with the flange 4 from a plastic material or the like. The cup-shaped plug portion 44 may be filled with ground cork 44 or other suitable insulating material. A disc-shaped closure 46 may be mounted in the upper end of the cup-shaped plug portion 44 to retain the insulating material 45.

The plastic jacket 3 may be formed so that the vacuum bottle will be extremely attractive in appearance. Moreover, the plastic jacket 3 protects the outside of the vacuum insulated receptacle 2 from corrosion and any possible scratches, dents or any other possible damage. Nevertheless, the plastic jacket 3 may be molded at extremely low cost. The handle 40 may be formed on the plastic jacket at a much lower cost than would be involved in providing a handle directly on the metal receptacle 2. Moreover, the screw threads 28 and 43 may be molded on the plastic jacket at much less cost than would be involved in forming corresponding threads directly on the metal receptacle 2. Likewise, the pouring lip 30 may be molded at extremely low cost on the plastic jacket 3. Much greater difficulty and cost would be involved in forming a similar pouring lip directly on the metal receptacle 2.

The plastic jacket 3 also provides a stable base for the vacuum bottle, so that there is no need to provide a base directly on the outer shell 9 of the receptacle 2.

The stainless steel neck 7 of the vacuum insulated receptacle 2 minimizes the transfer of heat to and from the inner shell 6. Stainless steel is a highly advantageous material for the neck, because of its low heat conductivity. The neck is made unusually long and thin to reduce the transfer of heat. In this respect, stainless steel is highly advantageous, because it is strong enough, even in the desired thin section, to withstand the forces imposed upon the neck by atmospheric pressure due to the evacuation of the space 10 between the inner and outer shells 6 and 9.

It is highly advantageous to make the inner shell 6 of aluminum, because it is easy to form into the desired shape of a necked-down bottle. Moreover, the aluminum inner shell resists corrosion and does not affect the taste of any beverage or food which may be kept in the vacuum bottle. The low emissivity of the aluminum reduces the loss of heat due to heat radiation. In addition, the aluminum inner shell is extremely light in weight, so that the inner shell does not need any support, other than that provided by the neck 7.

The collar 8 and the outer shell 9 may be made of an inexpensive material, such as mild steel, because these components are concealed from view by the outer jacket 3. An inexpensive painted finish may be employed on the outside of the collar 8 and the outer shell 9. Mild steel has the advantage of being strong, yet easy to work. Moreover, it is easy to form the welded joints between the steel components.

The vacuum bottle of the present invention is unbreakable and thus is very well suited for use by campers and workmen, or in locations where the vacuum bottle may be subject to rough handling. Moreover, the vacuum bottle is extremely attractive in appearance. Nevertheless, the vacuum bottle is unusually inexpensive in construction and easy to manufacture.

Various other modifications, alternative constructions and equivalents may be employed without departing from the true spirit and scope of the invention, as exemplified in the foregoing description and defined in the following claims.

I claim:
1. A vacuum bottle,
comprising the combination of a vacuum insulated receptacle having a bottle-shaped inner shell with a reduced upper end portion,
said inner shell being made of a soft easily worked metal which is highly resistant to corrosion,
said receptacle having a metal outer shell received around and spaced outwardly from said inner shell,
said receptacle having a generally tubular neck member connected between said inner and outer shells,
said neck member extending upwardly from said reduced portion of said inner shell,
said neck member being long and thin-walled to minimize heat transfer along said neck member,
said neck member being made of a corrosion resistant metal having a substantially lower heat conductivity than the metal of said inner shell,
said receptacle having an evacuated space between said inner and outer shells,
a plastic jacket received around and fully enclosing said outer shell,
and means forming a seal between the upper end of said plastic jacket and the upper end portion of said neck member.

2. A vacuum bottle according to claim 1,
comprising a pouring lip formed integrally with the upper end of said plastic jacket and flaring upwardly and outwardly from said neck member.

3. A vacuum bottle according to claim 1,
comprising a stopper for closing said neck member,
said stopper having a screw-threaded portion,
and mating screw threads formed integrally on said plastic jacket for receiving said screw-threaded portion of said stopper.

4. A vacuum bottle according to claim 1,
comprising a cup disengageably mounted on the upper end of said jacket,
said cup having internal screw threads therein,
said jacket being formed with integral screw threads for mating with said internal screw threads.

5. A vacuum bottle,
comprising the combination of a bottle-shaped inner shell made of corrosion resistant aluminum,
said inner shell having a reduced upper end portion,
a metal outer shell received around and spaced outwardly from said inner shell,
a generall tubular neck member connected between said inner and outer shells and extending upwardly from said reduced upper end portion of said inner shell,
said neck member being long and thin-walled to minimize heat transfer along said neck member,
said neck member being made of corrosion resistant stainless steel having a substantially lower heat conductivity than the aluminum of said inner shell,
a vacuum tight joint being formed between said neck member and said inner shell,
said inner and outer shells having an evacuated space therebetween,
said neck member having an upper end portion in the form of an annular flange curving outwardly and then downwardly to form a skirt portion,
said outer shell having an upper end portion joined to said skirt portion,
a plastic jacket received around and fully enclosing said outer shell,
and means forming a seal between the upper end of said plastic jacket and said annular flange on said neck member.

6. A vacuum bottle according to claim 5,
in which said outer shell is made of mild steel,
a welded joint being formed between the upper end portion of said outer shell and said skirt portion of said neck member.

7. A vacuum bottle according to claim 5,
in which a welded joint is formed between the upper end portion of said inner shell and the lower end portion of said neck member.

8. A vacuum insulated receptacle for a vacuum bottle,
comprising the combination of a bottle-shaped inner shell having a reduced upper end portion,
said inner shell being made of a soft easily worked metal having a high resistance to corrosion,
a metal outer shell received around said inner shell and spaced outwardly therefrom,
and a neck member connected between said inner and outer shells and extending upwardly from said reduced upper end portion of said inner shell,
said neck member being long and thin-walled to minimize the conduction of heat along said neck member,
said neck member being made of a corrosion resistant metal different from the metal of said inner shell and having a substantially lower heat conductivity than the metal of said inner shell,
said neck member having an upper end portion in the form of a flange curving outwardly and then downwardly to form a skirt portion, the upper end of said outer shell being joined to said skirt portion.

9. A vacuum insulated receptacle for a vacuum bottle,
comprising a bottle-shaped inner shell having a reduced upper end portion,
said inner shell being made in one piece of corrosion resistant aluminum,
a metal outer shell received around said inner shell and spaced outwardly therefrom,
and a generally tubular neck member connected between said inner and outer shells,
said neck member being long and thin-walled to minimize conduction of heat along said neck member,
said neck member being made of corrosion resistant stainless steel having a substantially lower heat conductivity than the aluminum of said inner shell,
a vacuum tight joint being formed between said inner shell and said neck member,
said stainless steel neck member having an upper end portion in the form of an annular flange curving outwardly and then downwardly to form a skirt portion,
said outer shell having an upper end portion joined to said skirt portion.

10. A vacuum insulated receptacle according to claim 9,
in which said outer shell is made of mild steel.

References Cited
UNITED STATES PATENTS

| | | | |
|---|---|---|---|
| 2,089,805 | 8/1937 | Lear | 220—14 X |
| 3,163,307 | 12/1964 | Bramming | 215—13 |
| 3,207,354 | 9/1965 | Skinner et al. | 220—15 |

JOSEPH R. LECLAIR, *Primary Examiner.*

D. F. NORTON, *Assistant Examiner.*